United States Patent [19]
Masaoka

[11] Patent Number: 6,012,499
[45] Date of Patent: Jan. 11, 2000

[54] PNEUMATIC TIRE INCLUDING INCLINED GROOVES AND CONNECTION GROOVES

[75] Inventor: Ken Masaoka, Tokyo, Japan

[73] Assignee: Bridgestone Corporation, Tokyo, Japan

[21] Appl. No.: 09/034,315

[22] Filed: Mar. 4, 1998

Related U.S. Application Data

[63] Continuation of application No. 08/623,989, Mar. 29, 1996, Pat. No. 5,769,977.

[30] Foreign Application Priority Data

Mar. 29, 1995 [JP] Japan ................................. 7-071555
Sep. 29, 1995 [JP] Japan ................................. 7-275080

[51] Int. Cl.⁷ ........................... B60C 11/11; B60C 11/12; B60C 11/13; B60C 115/00
[52] U.S. Cl. ............... 152/209.18; 152/209.22; 152/209.23; 152/209.28; 152/DIG. 3
[58] Field of Search ................ 152/209 R, 209 B, 152/209 D, DIG. 3, 209.18, 209.21, 209.22, 209.23, 209.28

[56] References Cited

U.S. PATENT DOCUMENTS

| | | | |
|---|---|---|---|
| 2,327,057 | 8/1943 | Ofensend | 152/209 R |
| 3,373,790 | 3/1968 | Newman et al. | 152/209 R |
| 3,586,086 | 6/1971 | Boileau | 152/209 R |
| 3,682,220 | 8/1972 | Verdier | 152/209 D |
| 3,768,535 | 10/1973 | Holden | 152/209 R |
| 4,177,850 | 12/1979 | Ogawa et al. | 152/209 R |
| 4,796,683 | 1/1989 | Kawabata et al. | 152/209 R |
| 4,995,437 | 2/1991 | Enoki et al. | 152/209 R |
| 5,044,414 | 9/1991 | Ushikubo | 152/209 R |
| 5,127,455 | 7/1992 | Remick | 152/209 R |
| 5,375,639 | 12/1994 | Suzuki | 152/209 R |
| 5,769,977 | 6/1998 | Masaoka | 152/209 R |

FOREIGN PATENT DOCUMENTS

| | | | |
|---|---|---|---|
| 0 422 902 A2 | 4/1991 | European Pat. Off. | |
| 2 452 391 | 11/1980 | France | 152/209 D |
| 27 07 504 | 8/1978 | Germany | 152/209 D |
| 3-100503 | 9/1978 | Japan . | |
| 8-136502 | 8/1983 | Japan . | |
| 61-60308 | 3/1986 | Japan . | |
| 61-85206 | 4/1986 | Japan . | |
| 61-200007 | 9/1986 | Japan . | |
| 62-157807 | 7/1987 | Japan | 152/209 R |
| 62-157808 | 7/1987 | Japan | 152/209 R |
| 136801 | 5/1989 | Japan | 152/209 R |
| 1-208205 | 8/1989 | Japan . | |
| 1-275203 | 11/1989 | Japan . | |
| 345503 | 12/1992 | Japan | 152/209 R |
| 178024 | 7/1993 | Japan | 152/209 D |
| 5-270214 | 10/1993 | Japan | 152/209 R |
| 2 231 538 | 11/1990 | United Kingdom . | |

OTHER PUBLICATIONS

Patent Abstracts of Japan, vol. 18, No. 41, JP–5270214, Oct. 19, 1993.

*Primary Examiner*—Steven D. Maki
*Attorney, Agent, or Firm*—Sughrue, Mion, Zinn, Macpeak & Seas, PLLC

[57] ABSTRACT

A pneumatic tire comprising a tread portion having a plurality of blocks which are defined by inclined grooves and by a plurality of connection groves connecting with the inclined grooves or with the tread end, wherein the side wall portion of a block facing a first inclined groove coming into contact with the ground precedingly is more rigid than the side wall portion of the same block facing a second inclined groove coming into contact with the ground following the first inclined groove, and the side wall portion of the same block located at the inner side in the tire width direction is more rigid than the side wall portion located at the outer side in the tire width direction.

6 Claims, 9 Drawing Sheets

SECTIONAL VIEW ON A-A

SECTIONAL VIEW ON B-B

SECTIONAL VIEW ON A-A

FIG. 4B

SECTIONAL VIEW ON B-B

PNEUMATIC TIRE INCLUDING INCLINED GROOVES AND CONNECTION GROOVES

This is a continuation of application Ser. No. 08/623,989 filed Mar. 29, 1996 now U.S. Pat. No. 5,769,977.

BACKGROUND OF THE INVENTION

1. Field of the Invention

The present invention relates to a pneumatic tire, and more particularly to a heavy duty tire used for trucks or buses, having a tread portion having both block-keynote pattern and so-called unidirectional pattern in which inclined grooves extend from the inner side of the tire width direction to the outside at an angle, especially at more than 45°, to a plane passing the tire rotational axis (hereinafter referred to as "high angle uni-directional block pattern").

2. Description of the Prior Art

In general, a pneumatic tire has a variety of grooves which are different in direction, shape and so on at the tread portion in view of appearance, drainage and so on, to define a particular tread pattern.

Also, it is known that in tires for passenger cars it is advantageous in obtaining high drainage performance to form inclined grooves which extend from the inner side of the tire width direction to the outside at an angle, especially at more than 45°, to a plane passing the tire rotational axis, that is a high angle uni-directional pattern.

It is further known that in heavy duty tires used for trucks or buses it is advantageous to form a plurality of circumferential grooves extending along the tire circumferential direction and a plurality of lateral grooves extending in the tire width direction, to define a so-called block pattern, in order to obtain high drainage performance and so on. The present inventor is concerned with developing a tire having a tread pattern which combines the block pattern with the high angle uni-directional pattern for higher drainage performance.

In general, a tire having a normal block pattern has tendency to undergo uneven wear so-called heel-and-toe wear, in which a kick-out portion of the block largely wears when the tire is rotated under load. This tendency is remarkable in a heavy duty tire because it is used under conditions of high tire-inner pressure and contacting pressure.

It is considered that the main cause of such uneven wear is the compressing transformation by the input from the ground when the step-in portion of the block contacts with the ground. That is, compressing transformation is accumulated as energy in the block while the block is in contact with the ground, and such accumulated energy is released when the kick-out portion of the block is detached from the ground, whereby a slip is generated between the kick-out portion and the ground accompanied with the release of said accumulated energy. This is continuously repeated, and as a result the kick-out portion undergoes wear.

As a means for controlling such uneven wear, it is advantageous to enhance the rigidity of the step-in portion of the block, whereby there is controlled the compressing transformation by the input from the ground when the step-in portion of the block is contacted with the ground, and the energy accumulated in the block is lowered. As a result the slip between the kick-out portion and the ground is controlled, as described in Japanese Patent Application Laid-open No. Hei 5-270214.

However, it has been ascertained that in the case of a tire having a high angle uni-directional block pattern, the uneven wear generates not only at the kick-out portion but also at the step-in portion of the block, which is peculiar to the above pattern.

Therefore, an object of the present invention is to provide a pneumatic tire having a uni-directional block pattern, especially a high angle uni-directional block pattern, at the tread portion, which controls uneven wear which tends to generate both at the kick-out portion and the step-in portion of the block, and maintains high drainage performance, by adjustment of the rigidity of the side wall portions of the block.

SUMMARY OF THE INVENTION

The present invention provides a pneumatic tire comprising a tread portion having a plurality of inclined grooves which extend respectively from the inner side of the tire width to the outer side at an angle to a plane passing the tire rotational axis and are arranged at intervals along the tire circumferential direction, and a plurality of blocks which are defined by the said inclined grooves and by a plurality of connection grooves connecting with the said inclined grooves or with the tread end, said inclined grooves coming into contact with the ground in order from the inner side of the tire width direction to the outer side, wherein the wall portion of a block facing a first inclined groove coming into contact with the ground precedingly is more rigid than the side wall portion of the said block facing a second inclined groove coming into contact with the ground following the first inclined groove, and the side wall portion of the said block located at the inner side in the tire width direction is more rigid than the side wall portion located at the outer side in the tire width direction.

The above connection groove indicates a groove suitably connecting with at least two inclined grooves. Also, although the present invention is explained on the assumption that the shape of the block surface is a parallelogram, it has only to be approximately a parallelogram, which includes other polygons or the case that the vertical angle portion is round in a strict sense. Also, it is preferable that the inclined grooves extend at more than 45° to a plane passing the tire rotational axis.

According to the present invention, because the side wall portion of the block facing the first inclined groove coming into contact with the ground precedingly is more rigid than the side wall portion of the same block facing the second inclined groove coming into contact with the ground following the first inclined groove, and the side wall portion of the same block located at the inner side in the tire width direction is more rigid than the side wall portion located at the outer side in the tire width direction, which are the remainder of the side walls of the block, the rigidity of the step-in portion of the block is enhanced and the compressing transformation by input from the ground when the step-in portion is contacted with the ground is controlled, whereby the energy accumulated in the block is lowered, and the slip between the step-in portion and the ground is also controlled. Also the core of wear, which tends to generate when side force acts on the block by enhancing the rigidity of the step-in portion as mentioned above, can be controlled. Therefore, uneven wear which tends to generate at both the kick-out portion and the step-in portion can be controlled.

DESCRIPTION OF THE PREFERRED EMBODIMENTS

Figure 1:
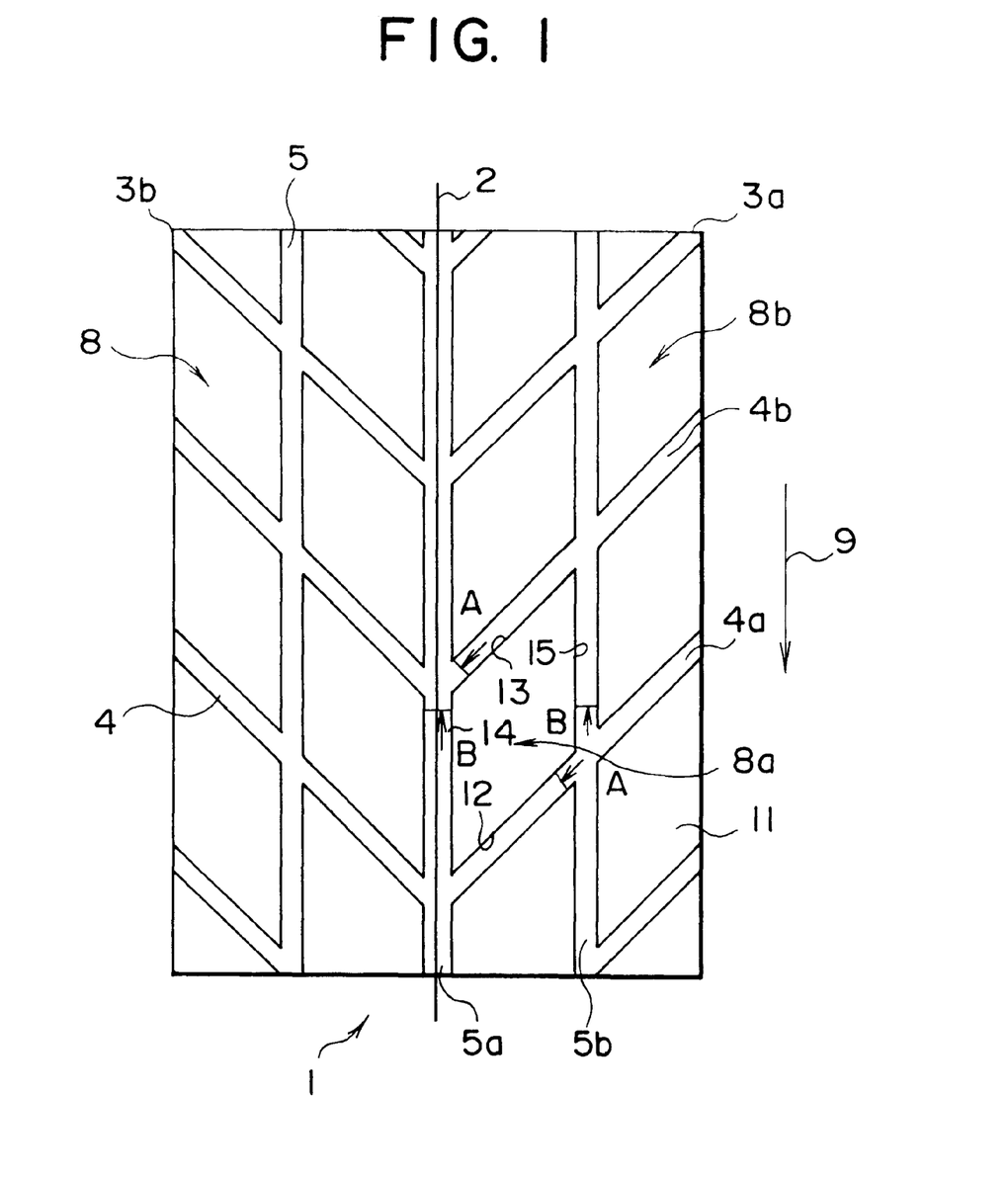
FIG. 1 is a development view of a part of a tread portion having a high angle uni-directional pattern, of a pneumatic tire according to the invention.

The tire of the present invention as shown in FIG. 1 provides a pneumatic tire comprising a tread portion 1 having a plurality of inclined grooves 4 which extend respectively from the inner side of the tire width direction to the outside at an angle to a plane passing the tire rotational axis and are arranged at intervals along the tire circumferential direction, and a plurality of blocks 8 which are defined by the inclined grooves 4 and a plurality of connection grooves 5 connecting with the inclined grooves 4 or with the tread end 3a, 3b. The inclined grooves 4 come into contact with the ground in order from the inner side of the tire width direction to the outer side. The side wall portion 12 of a block 8 facing a first inclined groove 4a coming into contact with the ground precedingly is more rigid than a side wall portion 13 of the same block facing a second inclined groove 4b coming into contact with the ground following the first inclined grove 4a, and a side wall portion 14 of the same block located at the inner side in the tire width direction is more rigid than a side wall portion 15 located at the outer side in the tire width direction.

The present invention includes some embodiments wherein the angles formed by the side walls and the tread surface are different, and wherein the groove has a bending or winding portion, and so on.

First, there is considered the case that the connection groove 5 extends along the tire circumferential direction and the angles formed by the side walls and the tread surface are different, among the above embodiments. In the following the above case is explained compared with a conventional tire.

FIG. 1 is a development view of a part of the tread portion of a typical pneumatic tire of such a type. The tread portion 1 has a plurality of inclined grooves 4a, 4b which extend respectively from the center line 2 of the tire to the tread ends 3a, 3b at an angle to a plane passing the tire rotational axis and are arranged at intervals along the tire circumferential direction, and a plurality of blocks 8 are defined by the inclined grooves 4a, 4b and by a plurality of connection grooves 5a, 5b connecting with the inclined grooves 4a, 4b or with the tread ends 3a, 3b. The inclined grooves 4a, 4b extend at an angle of more than 45° to a plane passing the tire rotational axis, that is the tread portion 1 has a high angle uni-directional block pattern.

The rotating direction 9 of the above tire is predetermined, that is the inclined grooves 4a, 4b come into contact with the ground in order from the inner side of the tire width direction to the outside.

Figure 2A:
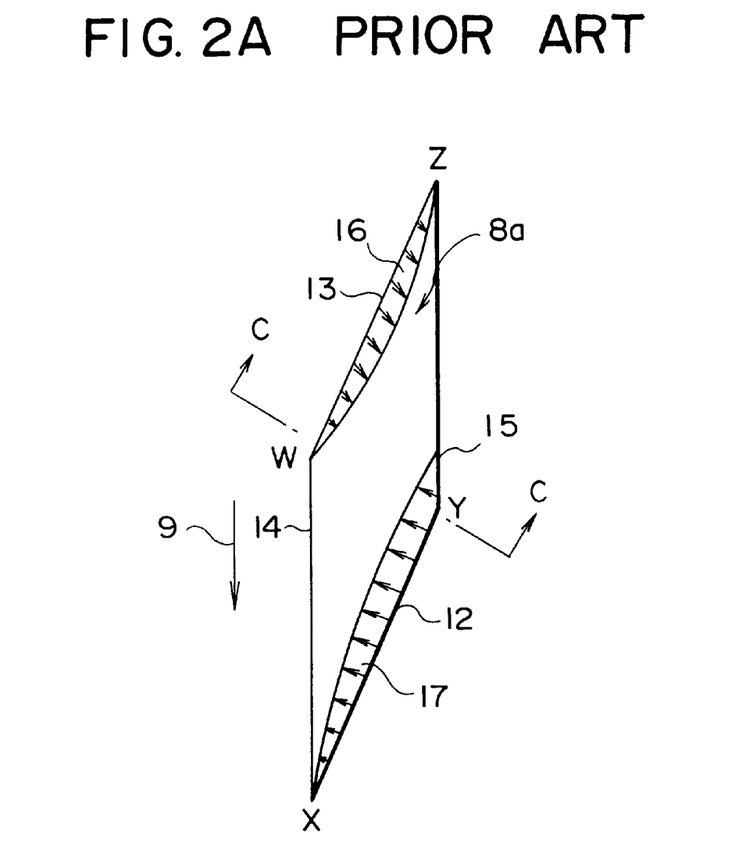
FIG. 2A is a plan view of a block of a conventional tire, in which the angles formed between the respective side walls of the block and the tread surface are all 90°, having the tread pattern as shown in FIG. 1.

First, the conventional tire is explained. FIG. 2A illustrates a block 8a chosen from FIG. 1. Four vertical angles of the block are denoted with symbols W, X, Y and Z, respectively, for convenience of explanation.

It is regarded as the cause of the uneven wear generated at the kick-out portion 16 (Z-W side) of the block 8a that the step-in portion 17 (X-Y side) of the block 8a is compressively transformed by input from the ground when the block is contacted with the ground, as described above.

Therefore, the present inventor has proposed, as described in Japanese Patent Application Laid-open No. Hei 5-270214, that the angles $\alpha 1$ and $\alpha 2$ which are formed respectively between the tread surface 11 and the side walls 12, 13 of the block 8a facing respectively the first inclined groove 4a coming into contact with the ground precedingly or the second inclined groove 4b coming into contact with the ground following the first inclined groove 4a, satisfy the following expression: $\alpha 1 > \alpha 2$, whereby the rigidity of the step-in portion 17 is enhanced and said compressing transformation is decreased, and as a result the uneven wear generating at the kick-out portion 16 (Z-W side) can be controlled.

The mechanism of the uneven wear generated at the step-in portion 17 (X-Y side) of the block can be understood as follows.

Figure 2B:
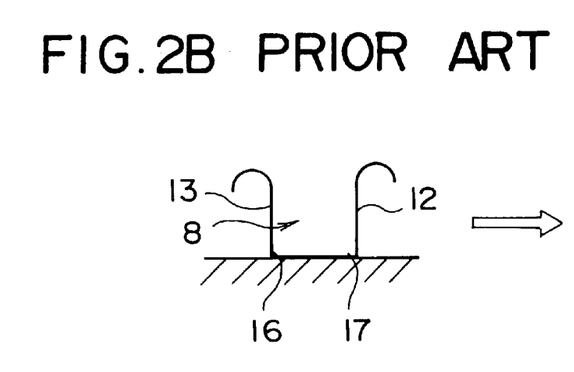
FIG. 2B is a sectional view on the line C—C as shown in FIG. 2A.
Figure 2C:
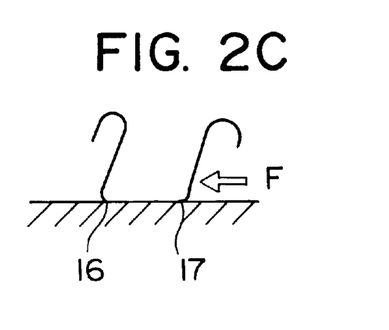
FIG. 2C is an explanatory view similar to FIG. 2B but when side force acts on the block.

FIG. 2B illustrates a sectional view of a block 8a taken on the line C—C as shown in FIG. 2A. When a side force F acts on the above block 8a, as shown in FIG. 2C, the contacting pressure of the step-in portion 17 (X-Y side) is partially enhanced and the core of wear has a tendency to generate here (especially at the vertical angle Y portion).

Figure 3A:
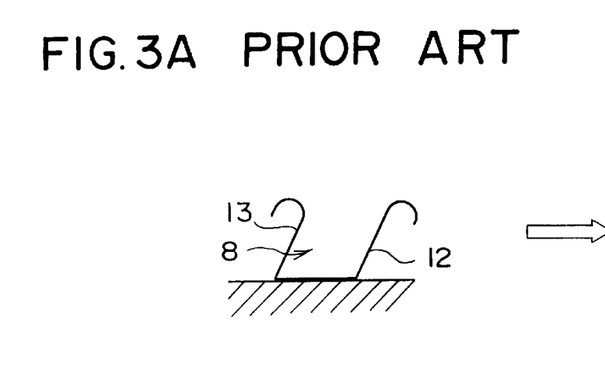
FIG. 3A is a sectional view similar to FIG. 2B, in the case that the angles formed by two side walls of the block and the tread surface are more than 90° and less than 90° respectively.
Figure 3B:
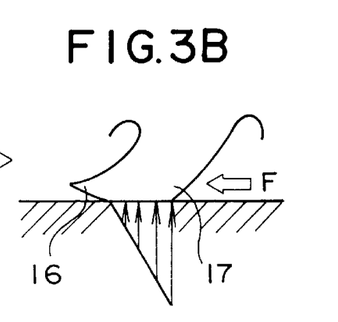
FIG. 3B is an explanatory view similar to FIG. 3A but when side force acts on the block.

At the above block, in the case that the angles $\alpha 1$, $\alpha 2$ which are formed by the two side walls 12, 13 of the block 8a facing respectively the first inclined groove 4a and the second inclined groove 4b and the tread surface 11 differ and $\alpha 1$ is larger than $\alpha 2$, as shown in FIG. 3A and 3B, the contacting pressure of the step-in portion 17 (X-Y side) is further enhanced. Therefore, the uneven wear of the step-in portion 17 (X-Y side) is promoted.

As a result the inventor has therefore proposed that, for controlling the uneven wear generated at the step-in portion 17 (X-Y side) of the block, the angles β1, β2 formed between the tread surface 11 and the side wall 14 located at the inner side of the tire width direction and the side wall 15 located at the outer side of the tire width direction differ and β1 is larger than β2, whereby the rigidity of the side wall 14 (W-X side) is enhanced, and the proportion of sharing of contacting pressure at the side wall 14 portion is enlarged when a side force acts on the block. Accordingly, the concentration of contacting pressure at the step-in portion (X-Y side) is mitigated and the uneven wear at said portion can be controlled.

Figure 4A:
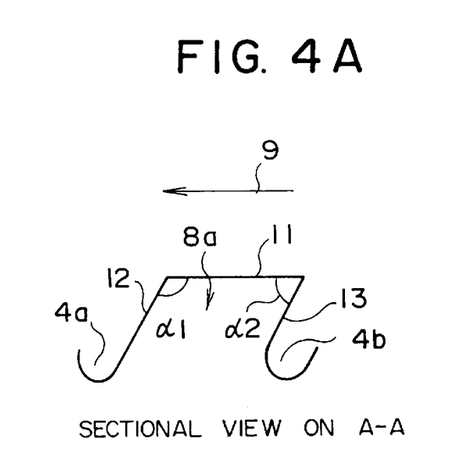
FIG. 4A is a sectional view on the line A—A of a block of the tire according to the invention as shown in FIG. 1.
Figure 4B:
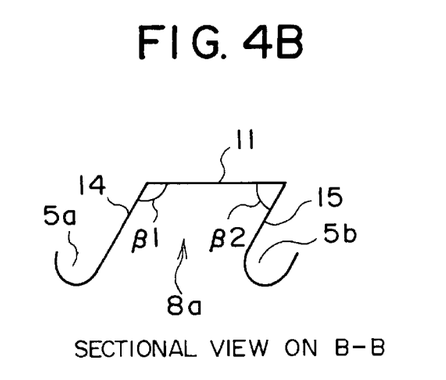
FIG. 4B is a sectional view on the line B—B of the block of the tire according to the invention as shown in FIG. 1.

Therefore, in the present case the angles α1, α2, β1 and β2 formed by four side walls 12, 13, 14 and 15 and the tread surface 11 satisfy the following expression: α1 >α2 and β1>β2, and more particularly α1>90°≧α2 and β1>90°≧β2. FIGS. 4A and 4B illustrate a block satisfying the above expressions. FIG. 4A is a sectional view on the line A—A orthogonally to an inclined groove, and FIG. 4B is a sectional view on the line B—B orthogonally to a connection groove.

Also, because the present tire has a high angle unidirectional block pattern, high drainage performance can be obtained.

Figure 10A:
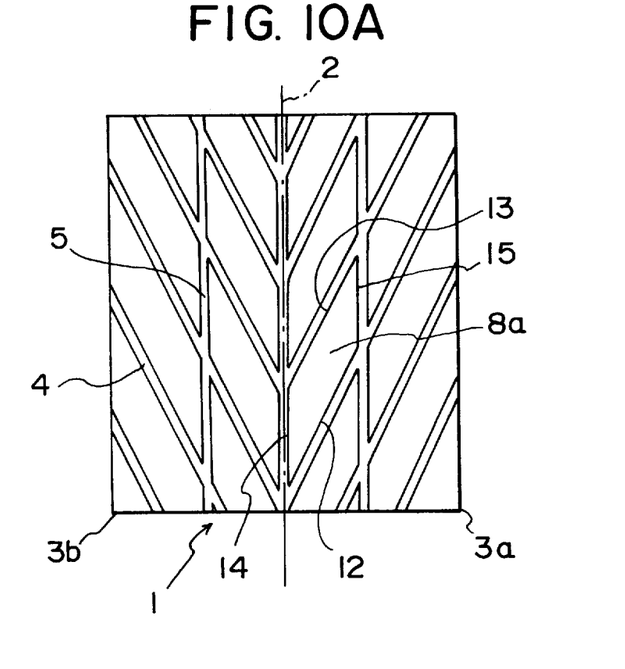
FIGS. 10A and 10B are development views illustrating the tread patterns used in test tires.
Figure 10B:
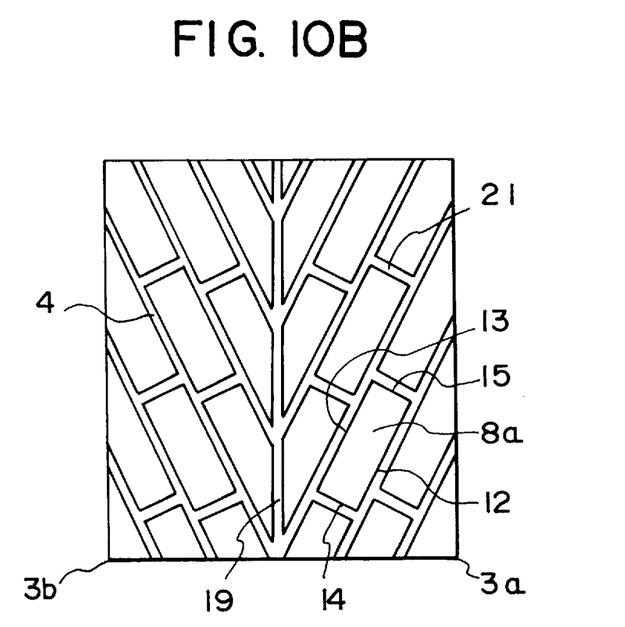

Although FIG. 1 illustrates that the connection grooves are circumferential grooves 5a, 5b extending along the tire circumferential direction, different patterns can be used; for example, as shown in FIG. 10B, the connection grooves can be auxiliary grooves 21 which connect with a central main groove 19 or two inclined grooves.

Figure 5A:
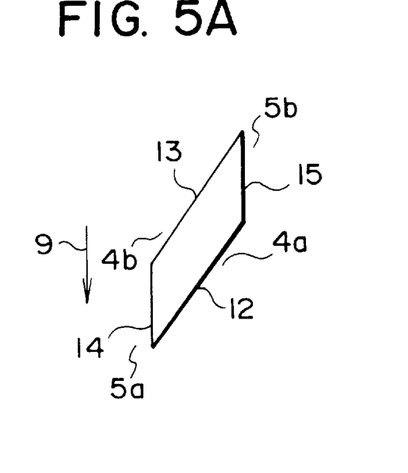
FIGS. 5A, 5B, 5C and 5D are plan views which illustrate a variety of shapes of the blocks.
Figure 5B:
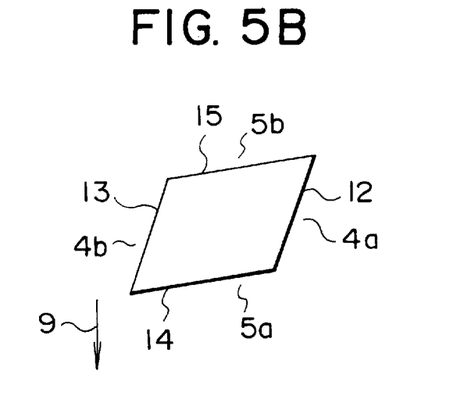

Also, although FIG. 1 shows the case that the shape of the tread surface 11 of the block 8a is substantially a parallelogram in which two side walls 14, 15 of the block extend in the tire circumferential direction, as shown in FIG. 5A the proportion of the length of each side can be changed compared with FIG. 2A, or as shown in FIG. 5B a parallelogram in which the connection grooves come into contact with the ground in order from the inner side of the tire width direction to the outer side can be used, or polygons of other shape can be used.

Figure 5C:
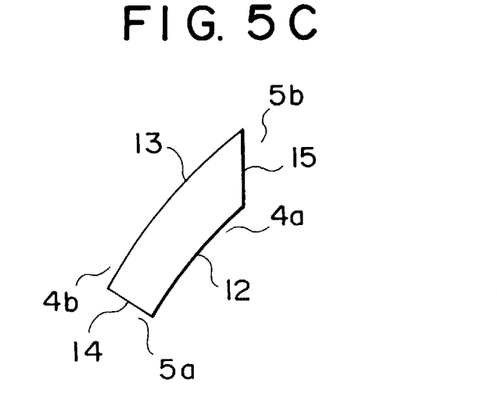
Figure 5D:
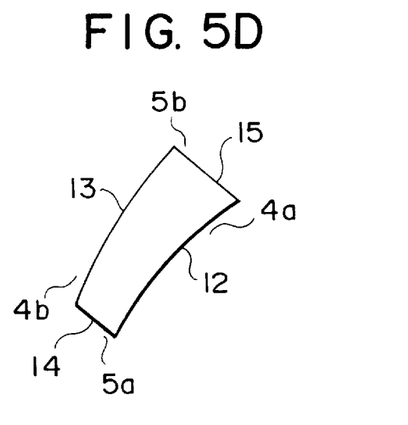
Figure 6:
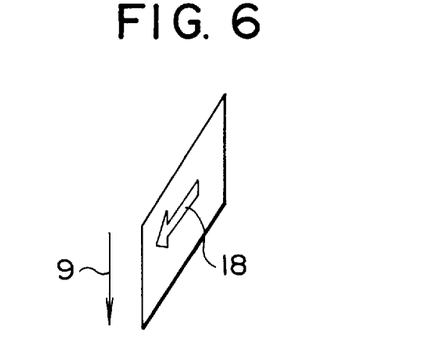
FIG. 6 is an explanatory view illustrating a direction of input, which is the maximum, to a block in the case of a tire used for running mainly straight.

In the case of a tire used for running mainly on straight roads, as shown in FIGS. 5C and 5D, it is preferable that at least the connection groove 5a which is located at the inner side of the tire width direction among the connection grooves 5a and 5b connecting with the inclined groove connects substantially orthogonally with the first inclined groove 4a and the second inclined groove 4b, respectively, because the input in the direction of an arrow 18 is a maximum as shown in FIG. 6. The connection groove 5a connects substantially orthogonally to the inclined groove, whereby the rigidity of the side wall 14 portion to the above input and the proportion of sharing of contacting pressure increases at said portion, which is further advantageous in controlling uneven wear.

Although the block 8a located at the vicinity of the center line is explained in the above section, the present invention is not limited to such blocks 8a and can be applied to other blocks 8b. Furthermore, the invention can be applied to all blocks or to some of the blocks, as circumstances require.

There will now be explained an embodiment wherein the sectional shape of the groove has a winding or bending portion. Such an embodiment has the same function as the above described type, wherein it can control the uneven wear generated at both the step-in portion and the kick-out portion, and detailed description of this function is therefore omitted.

However, the direction of winding or bending of the section of the groove can be understood as follows:

in the case that the first inclined groove and the second inclined groove have a bending or winding portion respectively, and toward the bottom said grooves bend or wind in the tire rotating direction or the outer side of the tire width direction;

in the case that the connection groove extends along the tire circumferential direction, and toward the bottom said groove bends or winds in the inner side of the tire width direction;

in the case that the connection groove comes into contact with the ground in order from the outer side of the tire width direction to the inner side, and toward the bottom said groove bends or winds in the tire inner side of the tire width direction or the tire rotating direction; and in the case that the connection groove comes into contact with the ground in order from the inner side of the tire width direction to the outer side, and toward the bottom said groove bends or winds in the outer side of the tire width direction or the tire rotating direction.

Figure 7:
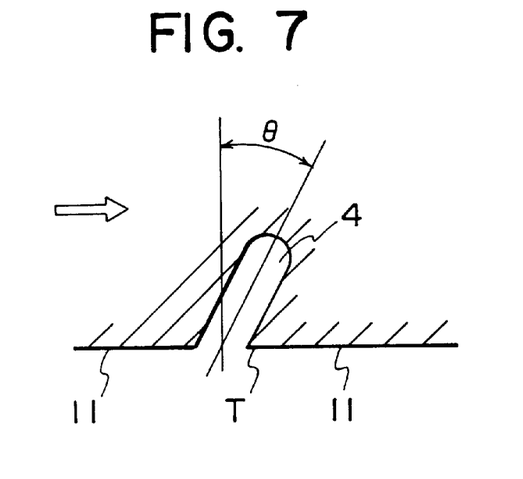
FIG. 7 is a sectional view of a groove having a sectional slant angle θ.

The present type is advantageous when the section slant angle θ of the groove with respect to a normal to the tread surface is not less than 20° as shown in FIG. 7, because the rigidity of the sectional acute edge T portion is so low that a "coming-off phenomenon" is generated by friction of the tire and the ground, although there is a tendency in a range of the angle that the larger said angle θ, the greater is the controlling effect of the uneven wear. This phenomenon particularly occurs in the case that the sectional acute edge T is the kick-out edge.

Therefore, it has been investigated as to which slant portion of the groove gives an important effect to improve the resistance of uneven wear. As a result, it has been found that the slant angle of the base of the block where the bending moment is the biggest, that is the sectional slant angle θ of the bottom portion of the groove, gives the most important effect. Therefore, it is advantageous in controlling the "coming-off phenomenon" that the groove is a winding or bending groove where the sectional slant angle θ of the bottom portion of the groove is not less than 20° and that of the vicinity of the tread surface is less than 20°.

Also, it is found that when the sectional slant angle θ is large, uneven wear is likely to again appear from the vicinity of the side wall facing the first inclined groove according to tread pattern. Therefore, it is preferable that a further groove or slit is arranged at the bottom of the first inclined groove, and/or a further groove or slit is arranged at the bottom of the connection groove connecting with the first inclined groove, or the outer portion of the said connection groove in the tire width direction is deeper than the inner portion thereof, because contacting pressure is partially lowered at the vicinity of the side wall facing the first inclined groove and thereby the uneven wear can be controlled. It is preferable that a winding or bending portion is in a range corresponding to 30–60% of the depth of the groove.

Figure 8A:
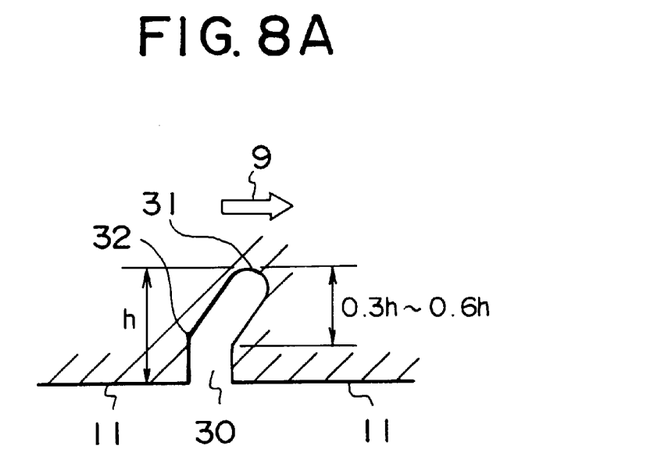
FIGS. 8A, 8B and 8C are sectional views of a bending groove or a winding groove provided in tires according to the invention.
Figure 8B:
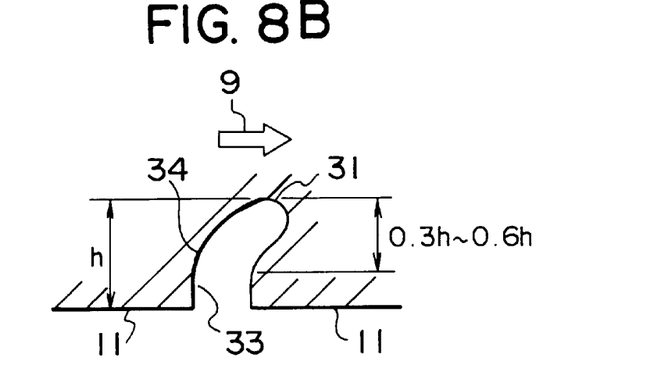
Figure 8C:
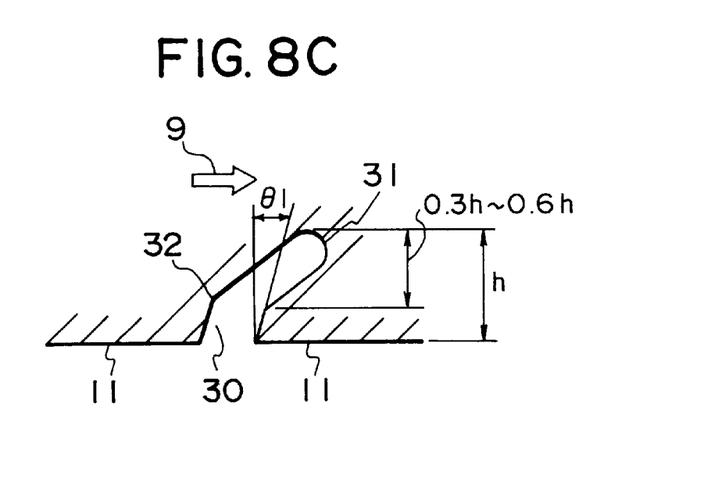

FIG. 8A is a sectional view of a bending groove 30, in which a bending position 32 is in a range corresponding to 30–60% of the depth h of the bending groove 30 measured from the groove bottom 31. FIG. 8B is a sectional view of a winding groove 33, in which a winding start position 34 is in a range corresponding to 30–60% of the depth h of the winding groove 33 measured from the groove bottom 31. FIG. 8C is a sectional view of another bending groove 30, in which the opening portion to the tread surface is inclined with respect to a normal to the tread surface, which is different from FIG. 8A, and the slant angle θ1 of the side wall of said opening portion with respect to the tread surface is less than 20°. In all of the above figures, the groove has a bending or winding portion, and toward the bottom said groove bends or winds in the tire rotating direction.

Figure 9A:
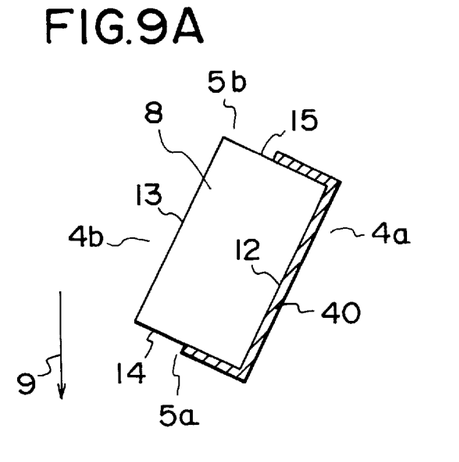
FIG. 9A is a plan view of a block in which a further groove or slit is arranged at the bottom of a first inclined groove and an outer portion in the tire width direction of a connection groove connecting with a first inclined groove, in a tire according to the invention.

FIG. 9A is a plan view of a block in which a further groove or slit 40 being narrower than an inclined groove is arranged at the bottom of the first inclined groove 4a along the side wall 12 of the block. The groove or slit 40 is also arranged at the outer portion in the tire width direction of the connection grooves 5a, 5b connecting with the first inclined groove 4a along the side walls 14, 15. Therefore, the groove or slit 40 surrounds the block 8 in a "C"-shape.

Figure 9B:
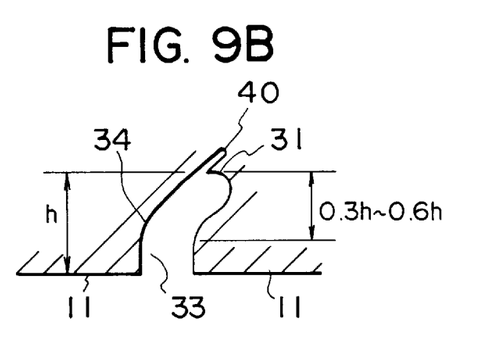
FIGS. 9B, 9C, 9D and 9E are sectional views of grooves in which a further groove or slit is arranged at the bottom thereof.
Figure 9C:
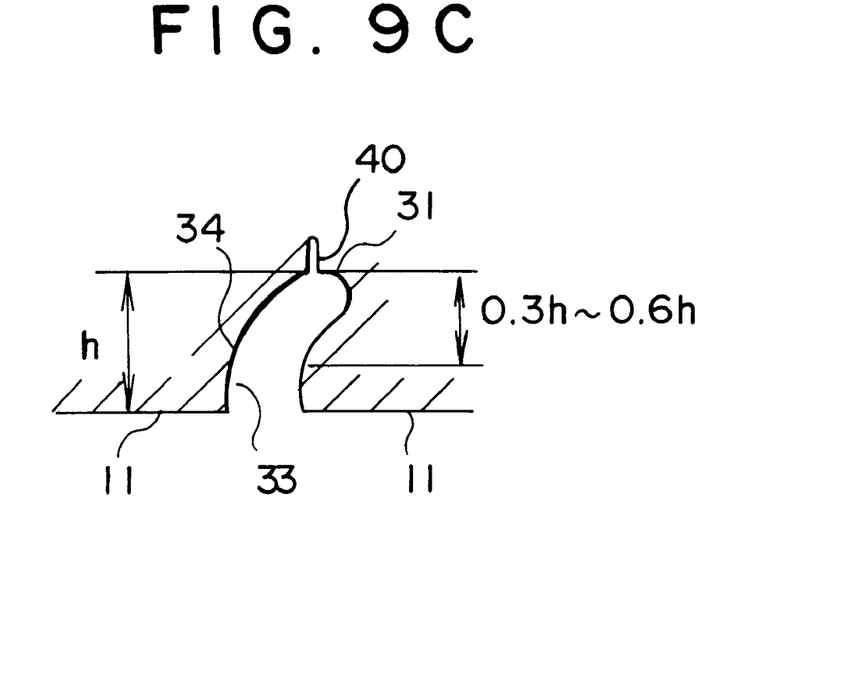
Figure 9D:
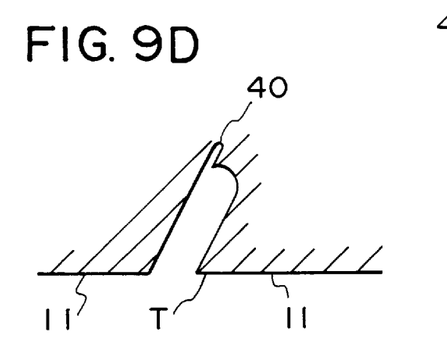
Figure 9E:
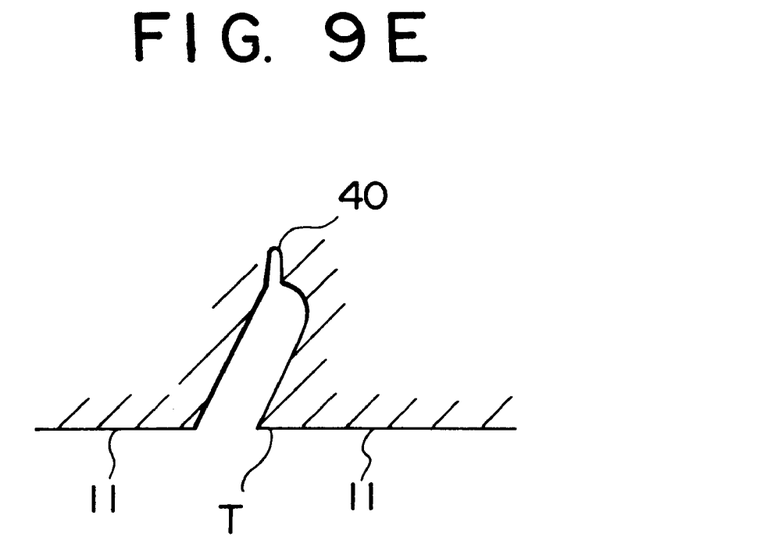

The first inclined groove and the connection groove include the case that it has a bending or winding portion (FIG. 9B and FIG. 9C) and the case that it does not have a bending or winding portion (FIG. 9D and FIG. 9E).

The direction in section of the groove or slit 40 which is further arranged at the bottom of the inclined groove can be selected as occasion demands, such as along the extension of the inclined groove (FIG. 9B and FIG. 9D) and substantially orthogonally to the tread surface (FIG. 9C and FIG. 9E).

Figure 9F:
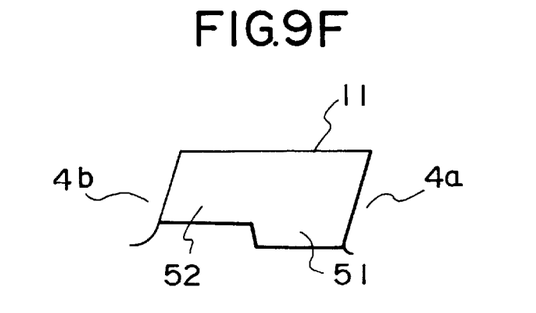
FIG. 9F is a sectional view along a connection groove of which the outer portion in the tire width direction is deeper than the inner portion.

Also, in said connection groove, the outer portion 51 in the tire width direction can be deeper than the inner portion 52, according to the width of the groove (FIG. 9F).

Also, for the above described embodiment, in the case of a tire used for running mainly straight, it is preferable that at least the connection groove which is located at the inner side of the tire width direction among the connection grooves connecting with the inclined groove connects substantially orthogonally with the inclined groove.

Although both types have been separately described above, they can be used together as shown in FIG. 8C, for example.

Also, except for the angle of the side wall of the groove or the section shape being wound or bent, an embodiment in which at least one slit is arranged to the side wall of the groove can accomplish the object and the effect of the present invention.

The following tests were carried out in order to demonstrate the effects of the present invention.

Three kinds of pneumatic tires A, B and C according to the present invention were manufactured for trial, and were tested for performance.

(1) Pneumatic tire A

A first embodiment tire was a pneumatic tire having a tread pattern as shown in FIG. 10A and having a tire size of TBR11R22.5. The tread portion 1 had a plurality of inclined grooves 4 which extend respectively from the center line 2 to the tread ends 3a, 3b at an angle of nearly 80° to a plane passing the tire rotational axis and are substantially straight, and three connection grooves 5 which extend in the tire circumferential direction. That is, a high angle unidirectional block pattern was formed. Four angles α1, α2, β1 and β2 which are respectively formed between the four side walls 12, 13, 14 and 15 of all blocks 8 and the tread surface 11 were 105°, 80°, 105° and 80°, respectively.

A first conventional tire had the same construction as the first embodiment tire except that the above angles α1, α2, β1 and β2 were all 90°.

A second conventional tire had the same construction as the first embodiment tire except that the above angles α1, α2, β1 and β2 were 105°, 80°, 90° and 90°, respectively.

(2) Pneumatic tire B

A second embodiment tire was a pneumatic tire having a tread pattern as shown in FIG. 10B and having a tire size of TBR11R22.5. The tread portion 1 had one center main groove 19 and a plurality of inclined grooves 4 which extend respectively from the center main groove to the tread ends 3a, 3b at an angle of nearly 80° to a plane passing the tire rotational axis and are substantially straight, and auxiliary grooves 21 which extend substantially orthogonally to two inclined grooves being adjacent. That is, a high angle unidirectional pattern was formed. Four angles α1, α2, β1 and β2 which are respectively formed between the four side walls 12, 13, 14 and 15 of all blocks 8 and the tread surface 11 were 105°, 80°, 105° and 80°, respectively.

A third conventional tire had the same construction as the second embodiment tire except that the above angles α1, α2, β1 and β2 were all 90°.

A fourth conventional tire had the same construction as the second embodiment tire except that the above angles α1, α2, β1 and β2 were 105°, 80°, 90° and 90°, respectively.

(3) Pneumatic tire C

A third embodiment tire was a pneumatic tire having a tread pattern as shown in FIG. 10B and having a tire size of TBR11R22.5. The tread portion 1 had one center main groove 19 and a plurality of inclined grooves 4 which extend respectively from the center main groove to the tread ends 3a, 3b at an angle of nearly 80° to a plane passing the tire rotational axis and are substantially straight, and auxiliary grooves 21 which extend substantially orthogonally to two inclined grooves being adjacent. That is, a high angle unidirectional pattern was formed. All of the inclined grooves 4 and the auxiliary grooves 21 were bending grooves as shown in FIG. 8B. The bending start points were positioned at 50% of the depth of the groove measured from the groove bottom, and after bending to the bottom the sectional slant angles of the grooves with respect to a normal to the tread surface were 15°.

A fourth embodiment tire had the same construction as the third embodiment tire except that the above sectional slant angles were 30°, and that as shown in FIG. 9A a further groove 40 was arranged at the bottom of the first inclined groove 4a along the side wall 12, and at the bottom of the outer portion in the tire width direction of the connection groove 5a, 5b connecting with the first inclined groove, and as a result the said outer portion 51 was deeper than the inner portion 52 as shown in FIG. 9F.

A fifth conventional tire had the same construction as the third embodiment tire except that the inclined grooves and the auxiliary grooves were not bending grooves and the sectional slant angles were substantially 90° with respect to the tread surface.

It will be understood that none of the first to the fifth conventional tires described above have the features in combination that the side wall portion 12 of the block is more rigid than the side wall portion 13, and the side wall portion 14 of the block is more rigid than the side wall portion 15. In the first to the fourth embodiment tires, the angles which are formed by the side walls of the block and the tread surface, and the bending or winding direction of the grooves, correspond to the rigidity relationship according to the invention.

Figure 11:
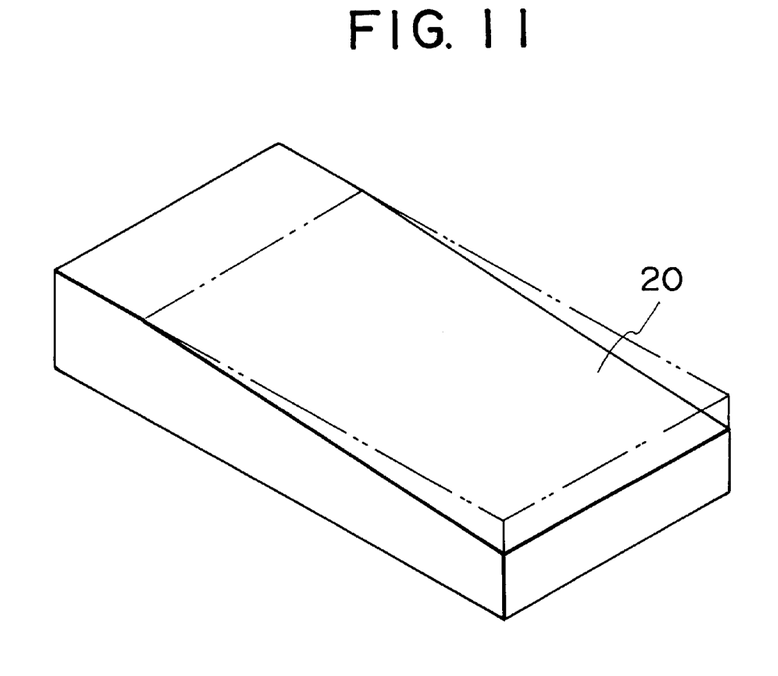
FIG. 11 is an explanatory view of a method of measuring the amount of uneven wear in the test.

Each of above test tires was mounted to the front axis of a car and the cars ran 30,000 km. After running, the amount of uneven wear at the step-in portion and the kick-out portion of the block were measured by measuring the decrease 20 in volume (the portion surrounded by twopointed chain line as shown in FIG. 11) at each portion, by which the uneven wear was estimated. Tables 1, 2 and 3 below show the test results obtained in which the numerical values are indexes on the basis that corresponding value of the first conventional tire, the third conventional tire and the fifth conventional tire is 100, respectively. The smaller the said numerical value, the less the uneven wear generated. Also, the "coming-off phenomenon" did not appear in the case of the fourth embodiment tire.

According to the invention, the uneven wear having tendency to generate at both the step-in portion and the kick-out portion of the block, which is a problem of the uni-directional block pattern, particularly the high angle uni-directional block pattern, can be controlled. Thereby, the use life of the tire can be lengthened, and deterioration of external appearance of the tire can be controlled. Therefore, it is possible to provide an improved pneumatic tire, particularly a heavy duty tire.

While the invention has been particularly shown and described with reference to certain preferred embodiments thereof, it will be understood by those skilled in the art that various changes and modifications may be made within the spirit and scope of the invention.

TABLE 1

|  | Uneven Wear Pneumatic tire A |
|---|---|
| First Conventional Tire | 100 |
| Second Conventional Tire | 50 |
| First Embodiment Tire | 38 |

TABLE 2

|  | Uneven Wear Pneumatic tire B |
|---|---|
| Third Conventional Tire | 100 |
| Fourth Conventional Tire | 43 |
| Second Embodiment Tire | 26 |

TABLE 3

|  | Uneven Wear Pneumatic tire C |
|---|---|
| Fifth Conventional Tire | 100 |
| Third Embodiment Tire | 33 |
| Fourth Embodiment Tire | 24 |

I claim:

1. A pneumatic tire comprising; a tread portion having a plurality of inclined grooves which extend outwardly respectively from an inner side of the tire in the width direction to an outer ground contact side oriented at an angle of more than 45° to the tire rotational axis and arranged at intervals along the tire circumferential direction, and a plurality of blocks which are defined by said inclined grooves and by a plurality of connection grooves connecting with said inclined grooves to define a high angle unidirectional block pattern, said inclined grooves coming into contact with the ground in order beginning with the inner side to the outer side, wherein the side wall portion of a block facing a first inclined groove coming into contact with the ground is precedingly more rigid than the side wall portion of said block facing a second inclined groove coming into contact with the ground following the first inclined groove, and the side wall portion of said block located at the inner side in the tire width direction is more rigid than the side wall portion of said block located at the outer side, and wherein angle $\alpha 1$ which is formed between the tread surface and the side wall portion of the block facing the first inclined groove and angle $\alpha 2$ which is formed between the tread surface and the side wall portion of the block facing the second inclined groove satisfy the following expression: $\alpha 1 > 90° \geq \alpha 2$, and angle $\beta 1$ which is formed between the tread surface and the side wall portion of the block located at the inner side and angle $\beta 2$ which is formed between the tread surface and the side wall portion of the block located at the outer side satisfy the following expression: $\beta 1 > 90° \geq \beta 2$.

2. The pneumatic tire according to claim 1, wherein at least the connection groove located at the inner side direction connects substantially orthogonally with the inclined groove.

3. The pneumatic tire according to claim 1, wherein a further groove or slit is arranged at the bottom of the first inclined groove.

4. A pneumatic tire according to claim 1, wherein a further groove or slit is arranged at the bottom of an outer portion in the tire width direction of the connection groove which connects to the first inclined groove.

5. The pneumatic tire according to claim 1, wherein an outer portion in the tire width direction of the connection groove is deeper than an inner portion in the tire width direction of said connection groove.

6. The pneumatic tire of claim 1 wherein said tire is a heavy duty truck or bus tire.

* * * * *